Figure 1:
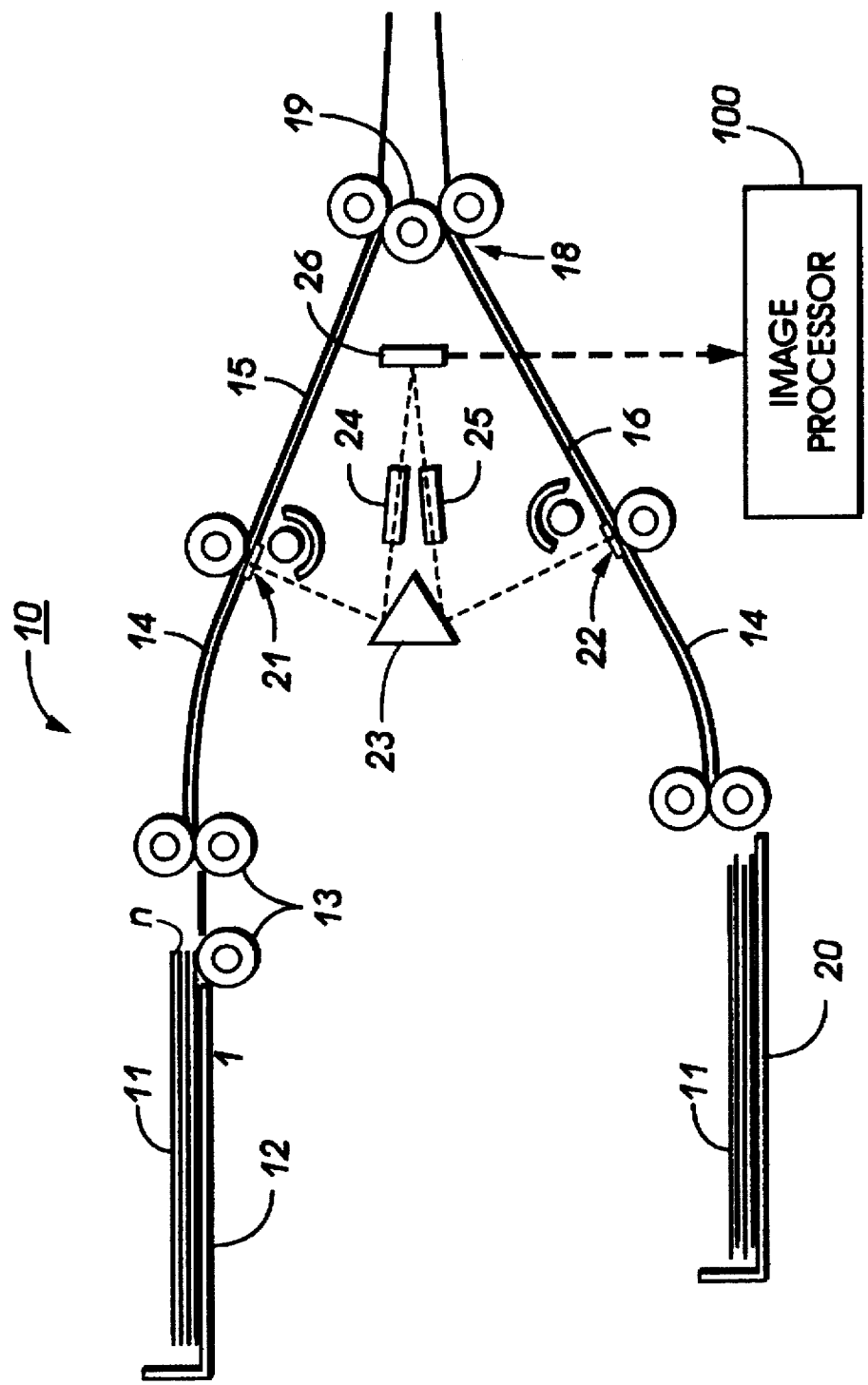

United States Patent [19]

Acquaviva et al.

[11] Patent Number: 5,689,792
[45] Date of Patent: Nov. 18, 1997

[54] SIMPLIFIED AND HIGHER PRODUCTIVITY DUPLEX DOCUMENT SCANNING SYSTEMS

[75] Inventors: Thomas Acquaviva, Penfield; James D. Rees, Pittsford; John A. Durbin, Webster, all of N.Y.

[73] Assignee: Xerox Corporation, Stamford, Conn.

[21] Appl. No.: 566,271

[22] Filed: Dec. 1, 1995

[51] Int. Cl.$^6$ ................................................ G03G 15/00
[52] U.S. Cl. .......................... 399/365; 399/367; 399/368; 399/374
[58] Field of Search .............................. 399/365, 367, 399/368, 369, 374; 355/23, 24; 358/482, 483, 496, 498

[56] References Cited

U.S. PATENT DOCUMENTS

| | | | |
|---|---|---|---|
| 4,035,073 | 7/1977 | DelVecchio | 355/24 |
| 4,261,661 | 4/1981 | Theirs | 355/24 |
| 4,419,007 | 12/1983 | Kingsley | 399/85 |
| 4,536,077 | 8/1985 | Stoffel | 355/8 |
| 4,673,285 | 6/1987 | Shogren | 355/23 |
| 4,743,974 | 5/1988 | Lockwood | 358/285 |
| 4,908,719 | 3/1990 | Nonoyama | 358/496 X |
| 5,091,755 | 2/1992 | Tashiro | 399/374 |
| 5,243,359 | 9/1993 | Fisli | 346/1.1 |
| 5,298,937 | 3/1994 | Telle | 355/23 |
| 5,339,139 | 8/1994 | Fullerton et al. | 399/203 |
| 5,463,451 | 10/1995 | Acquaviva et al. | 399/211 |

OTHER PUBLICATIONS

Xerox Disclosure Journal, vol. 12, No. 5, Sep./Oct. 1987, pp. 231–232 "Library Copier" by J. Guenther.
Xerox Disclosure Journal, vol. 9, No. 6, Nov./Dec. 1984, p. 383 "Book Copying Apparatus" by V. Agarwal.

Primary Examiner—William J. Royer

[57] ABSTRACT

A system for imaging both of the first and second opposing sides of duplex documents with higher productivity, with a generally "V" shaped low profile document sheet feeding path with first and second arms merging at a base position having a document reversing system, for sequentially feeding documents from an input tray through the first arm to the base position, and then back through the second arm to an output tray. A first imaging station is in the first arm for imaging the first sides of the documents, and a second imaging station is in the second arm for imaging the second sides. Both imaging stations have a simple, partially shared fixed elements optical system mounted entirely inside the document path, which can share a single electro-optical digital imager. The duplex documents are not inverted, yet are returned to the output tray in the same orientation as the stack in the overlying input tray. Compatible simplex document copying can also be provided. Additionally disclosed is a system for concurrently imaging the first and second sides of different sequential duplex documents in alternating image lines alternating between the first and second imaging stations.

19 Claims, 7 Drawing Sheets

SIMPLIFIED AND HIGHER PRODUCTIVITY DUPLEX DOCUMENT SCANNING SYSTEMS

Disclosed herein is an improved system for feeding and imaging documents, with improved and simplified document handling and imaging, particularly for imaging both of the first and second opposing sides of duplex document sheets. As disclosed, this system can also compatably provide high productivity simplex (one sided imaged) document sheet imaging.

Various of the exemplary embodiments disclosed herein disclose various different additional features and advantages, including: document imaging systems with simplified optics, not requiring disadvantageous flipping or moving mirrors or other such costly or difficult to maintain in alignment imaging systems; improved systems of electronic imaging with electronic imaging devices such as CCDs or other digital document input scanners; advantageously sharing one single such electronic imaging device for images of both sides of duplex documents; sequential entire page or alternate lines imaging, alternating between two different imaging stations partially sharing a compact fixed optical system mounting between the two imaging stations; elimination of the normal requirement to invert or turn over the duplex document sheets being imaged, so that the duplex documents may remain oriented with, and be restacked with, the same side up; optional 1 to N or N to 1 (forward or reverse serial page order) document feeding, copying and collated restacking with the same system; and a simplified scanning system architecture wherein the document feeding path may be a simple generally "V" (or "Y") shaped feeding path, with a simple reversing system between the two converging arms of the V (the base of the Y), and with input and output trays at the respective two open ends of the V, with no arcuate loops or bends in the paper path which could cause undesirable potential sheet feeding jam sites, or difficulties in feeding heavy sheets; and wherein all of the optical imaging system may be mounted compactly and simply within this V shaped document path. Other features disclosed in the various embodiments will be apparent therefrom.

By way of background as to a recent patent on a document feeder for automatically sequentially feeding simplex or duplex document sheets from a stack thereof to be imaged, there is noted Xerox Corporation U.S. Pat. No. 5,339,139 issued Aug. 16, 1994 to Jack K. Fullerton, et al., and other art cited therein. A duplex sheet reversing and inverting system with arcuate paths for sequentially electronically imaging both sides of a duplex document at a single imaging station is disclosed therein. Another duplex and simplex document feeding and imaging system with a single imaging station and electronic imager is disclosed in Xerox Corporation U.S. Pat. No. 4,419,069 issued Dec. 6, 1983 to William Kingsley.

Further examples of duplex (or simplex) document scanning or imaging systems which scan opposite sides of duplex documents onto a single imaging device include U.S. Pat. No. 4,536,077 issued Aug. 20, 1985 to James E. Stoffel; and U.S. Pat. No. 4,673,285 issued Jun. 16, 1985 to David K. Shogren. Optical copiers imaging both sides of a duplex document onto a photoreceptor, rather than an electronic digitizing device, are also know, e.g.; Xerox Corporation U.S. Pat. No. 4,035,073 issued Jul. 12, 1977 to George DelVecchio, and Agfa-Gevaert Nv U.S. Pat. No. 4,261,661 issued Apr. 14, 1981 to Christian G. Thiers.

Of further interest for a simple document handling system with a single electronic imaging device for duplex or simplex document copying, where the image from one imaging station is imaged through the other imaging station, with a partially shared optics path (but not allowing simultaneous use of the two imaging stations) is Xerox Corporation U.S. Pat. No. 5,463,451 issued Oct. 31, 1995 to the same Thomas Acquaviva, and others.

It is also known in the art to provide electronic scanning of duplex documents by providing a system with two separate or dual imaging stations and/or two separate electronic scanners or other electronic imaging devices. Two imagers of course requires the additional cost of another such dual electro-optical digital imaging bar or the like. Such imagers or imaging devices, particularly those providing full document width arrays with high imaging resolution, e.g. several hundred pixels or dots per inch, can be relatively expensive. Also, duplex document scanning systems with dual imagers typically require duplicative optics and/or moving optical elements in the optical system providing the transmission of the scanned light lines optical images from the illuminated document being scanned to the electronic imaging device. Examples of such dual imager duplex document imaging systems include Eastman Kodak Company U.S. Pat. No. 5,298,937 issued Mar. 29, 1994 to Lawrence B. Telle; Xerox Disclosure Journal Vol. 8, No. 3, May/June, 1983, page 263, by Richard E. Smith; Xerox Corporation U.S. Pat. No. 4,743,974 issued May 10, 1988 to Dan F. Lockwood; Eastman Kodak Company U.S. Pat. No. 4,734,741 issued Mar. 29, 1988 to Robert C. Klumpp, et al; and Fuji Xerox Co., U.S. Pat. No. 4,571,636 issued Feb. 19, 1986 to Satoru Itoh.

Of particular interest as to alternate lines scanning is said Lockwood Xerox Corp. U.S. Pat. No. 4,743,974, which in Col. 6, the first paragraph, suggests that image information from a CCD array on each side of the document can be derived and transmitted alternately, which could suggest alternate line scanning but only of the opposite sides of the same document and with two CCD imagers.

Further as to background in digital imagers per se, for line scanning systems for imaging a moving document, such as charge couple devices (CCD) or other full width imaging arrays, in addition to the above-cited Lockwood Xerox Corp. U.S. Pat. No. 4,743,974, examples of Xerox Corp. patents relating to such beginning and ending of line scan identification signals and image line scan information signals, and other details of exemplary CCD or other electro-optical imaging arrays in general, include U.S. Pat. Nos. 4,878,119; 5,043,827; and 5,113,260. In particular, there is noted the raster input scanner and serial pixel readout scheme of Xerox Corp. U.S. Pat. No. 5,452,001 issued Sep. 19, 1995 to Paul A. Hosier and Scott L. Tewinkle.

It will be noted, particularly as to the FIG. 3 embodiment hereinbelow, that such electro-optical digital imager arrays typically produce an end of line or sink signal when they are read, which signal in said FIG. 3 embodiment or otherwise can readily provide a signal for indicating switching between line scans as further discussed herein in connection with those particlular embodiment examples. It is noted, however, that rather than using the end of line signal from these or other full width array digital imagers, it may be preferable to use the "sync" line start of scan line signal which is provided in such systems, which is otherwise known as a "dump end" signal, for triggering the switching or multiplexing between line scans to switch between the two difference page buffers for the two separate page images as further described herein in connection with certain of the disclosed embodiments.

Figure 4:
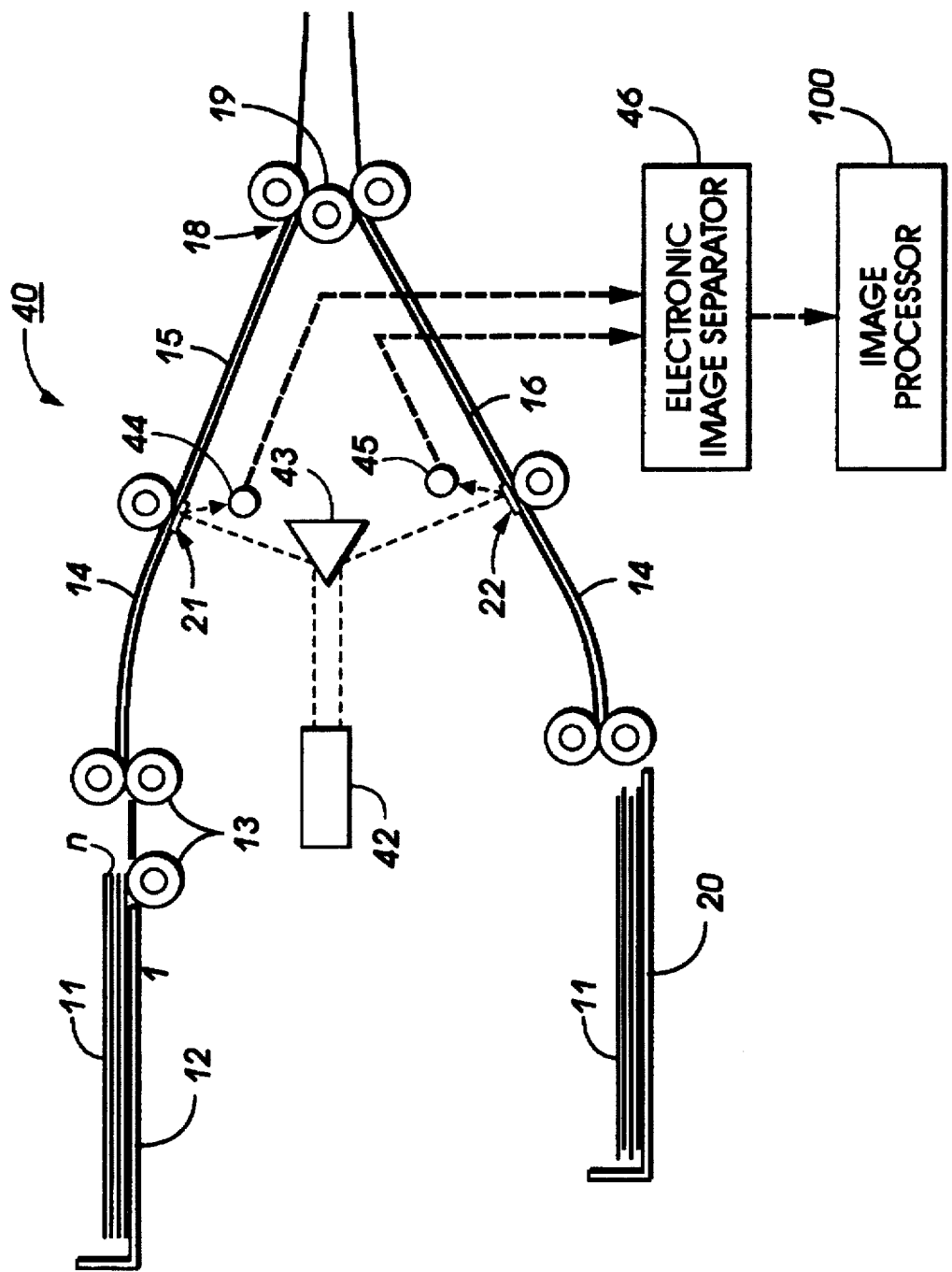

By way of background as to another one of the embodiments herein, in FIG. 4, it will be appreciated that the illumination for line scanning of a document or photoreceptor by a scanned laser beam is known per se. One example there of is Xerox Corporation U.S. Pat. No. 5,243,359 issued Sep. 7, 1993 to Tibor Fisli.

Also noted by way of background as to "roof" or vertically inverted V shaped copying platens for copiers, specifically for book copying, and optical imaging systems for their two angled platen surfaces, are Xerox Disclosure Journal publications in Vol. 12, No. 5, September/October, 1987, pages 231–232, and Vol. 9, No. 6, November/December, 1984, page 383.

By way of background for the exemplary disclosed sheet reversing system in the embodiments herein, it will be appreciated that many alternatives therefor may be employed, not only the well-known three roll inverter system illustrated, but also simple reversing nip roller pairs, as in the above-cited U.S. Pat. No. 5,339,139. Also, the sheet reversal system may be used from sheet inverter systems in which the entering sheet may be fed into the inverter chute simultaneously with the exit from the inverter chute of the previous sheet, in an overlapping manner. E.g., Xerox Corporation U.S. Pat. No. 4,214,740 issued Jul. 29, 1980 by the same Thomas Acquaviva. This can even further reduce the inter-document time, gap, space or pitch, as it is variously referred to, for even faster overall document throughput rates, as will be further discussed.

Additional citations of references on these subjects and other disclosures of possible interest are also provided by the above noted references, which are merely exemplary.

A specific feature of the specific embodiments disclosed herein is to provide an imaging system for imaging with higher productivity both of the first and second opposing sides of duplex document sheets sequentially fed from a stack thereof in an input tray, comprising a generally "V" shaped document feeding path with first and second arms meeting at a base position, a document sheet feeding input path system for sequentially feeding document sheets from said input tray into and through said first arm to said base position, a document sheet reversing system at said base position for reversing document sheets received from said first arm and feeding them into said second arm, a document sheet feeding output path system for feeding document sheets through said second arm from said base position, a document sheet output tray for receiving documents fed through said second arm from said base position, a first imaging station in said first arm for imaging said first sides of said document sheets, and a second imaging station in said second arm for imaging said second sides of said document sheets.

Further specific features provided by the system disclosed herein, individually or in combination, include those wherein said imaging system feeds and images both of said first and second opposing sides of said duplex document sheets sequentially fed from said input tray to said output tray without ever inverting or turning over said duplex document sheets so that said duplex document sheets are returned to said output tray in the same orientation as said stack in said input tray; and/or wherein said duplex document sheets may be stacked in said input tray and sequentially fed to be imaged in either forward or reverse serial order; and/or wherein said "V" shaped document feeding path is lying on its side; and/or said first and second imaging stations image said first and second opposing sides of the same document sheet in immediate sequence; and/or wherein said first and second imaging stations concurrently image all of said first and second opposing sides of different sequential said document sheets in alternating image lines alternating between said first and second imaging stations; and/or wherein said first and second imaging stations comprise a non-moving optics system which is entirely mounted in between said first and second arms of said document feeding path; and/or wherein said first and second imaging stations comprise respective first and second converging paths optics systems and a single common electronic image conversion device onto which said first and second optics systems optically line image said document sheets while said document sheets are feeding through said first and second imaging stations; and/or wherein said first and second imaging stations image said first and second opposing sides of the same document sheet in immediate sequence; and/or wherein said first and second imaging stations concurrently image all of said first and second opposing sides of different sequential said document sheets in alternating image lines alternating between said first and second imaging stations; and/or an imaging system for imaging both of the first and second opposing sides of duplex document sheets with improved productivity, said imaging system including a sheet feeding path system with an input tray and first and second sheet feeding paths, and first and second imaging stations, for sequentially feeding said duplex document sheets from a stack thereof in said input tray to said first imaging station in said first sheet feeding path for imaging said first sides of said document sheets and theft feeding said document sheets on to said second imaging station in said second sheet feeding path for imaging said second sides of said document sheets, wherein said first imaging station comprises an electronic imaging device and a first optics path system for imaging said first sides of said document sheets onto said electronic imaging device, and said second imaging station comprises said same electronic imaging device and a second optics path system for imaging said second sides of said document sheets onto said same electronic imaging device, and wherein said electronic imaging device and said first optics path system and said second optics path system are all located in between said first sheet feeding path and said second sheet feeding path; and/or wherein said first and second optical path systems comprises non-moving optics entirely mounted in between said first and second sheet feeding paths; and/or wherein said first and second optics path systems share a wedge shaped dual mirror interposed between said first imaging station and said second imaging station to provide a converging optical path from both said first and second imaging stations to said same electronic imaging device; and/or wherein said wedge shaped dual mirror is fixed and is the only mirror in said first and second optics path systems; and/or wherein said sheet feeding path system feeds said duplex document sheets through both said first and second sheet feeding paths without ever inverting or turning over said duplex document sheets so that said duplex document sheets are returned to said output tray in the same orientation of said stack in said input tray; and/ or wherein said duplex document sheets may be stacked in said input tray and sequentially fed into said sheet feeding path system to be imaged in either forward or reverse serial order; and/or wherein said sheet feeding path system includes a sheet reverser between said first and second sheet feeding paths, and said sheet feeding path system feeds said duplex document sheets through both said first and second sheet feeding paths with one reversal in said sheet reverser and without ever inverting said duplex document sheets so that said duplex document sheets are returned to said output tray in the same orientation of said stack in said input tray; and/or wherein said sheet feeding path system comprises a generally "V" shaped document feeding path with first and second arms meeting at a base position, a document sheet feeding input path system for sequentially feeding document sheets from said input tray into and through said first arm to said base position, a document sheet reversing system at said base position for reversing document sheets received from said first arm and feeding them into said second arm, a document sheet feeding output path system for feeding document sheets through said second arm from said base position, and a document sheet output tray for receiving documents fed through said second arm from said base position.

As xerographic and other copiers and printers increase in speed, and become more automatic, it is increasingly important to provide higher speed yet more reliable and more automatic handling of document sheets being imaged or copied, i.e. the image input substrates. It is desirable to reliably feed, and accurately register for copying, document sheets of a variety or mixture of sizes, types, weights, materials, conditions and susceptibility to damage. Original document handling is often more difficult and critical than feeding stock blank or virgin sheets.

In the description herein the term "sheet" refers to a usually flimsy physical sheet of paper, plastic, or other suitable physical substrate for images, whether precut or initially web fed. A "copy sheet" may be abbreviated as a "copy", or called "hardcopy". A "simplex" document or copy sheet is one having its image and page number on only one side or face of the sheet, whereas a "duplex" document or copy sheet has "pages", and normally images, on both sides, i.e., each duplex document is considered to have two opposing sides, faces, or "pages" even though no physical page number may be present.

As to usable specific or alternative hardware or software components of the subject apparatus, it will be appreciated that, as is normally the case, some such components are known per se in other apparatus. Some examples are in the cited art and its references.

The presently disclosed apparatus may be readily operated and controlled with conventional control systems. It is well known and commonplace to program and execute imaging, printing, document, and/or paper handling control functions and logic with software instructions for conventional or general purpose microprocessors, and/or various commercial special purpose imaging processing chips. This is taught by various prior patents and commercial products. Such programming or software may of course vary depending on the particular functions, software type, and microprocessor or other computer system utilized, but will be available to, or readily programmable without undue experimentation from, functional descriptions, such as those provided herein, or prior knowledge of functions which are conventional together with general knowledge in the software and computer arts. Alternatively, the disclosed system or method may be implemented partially or fully in hardware, using standard logic circuits or a single chip using VLSI designs. It is also well known in the art that in a modern document system or networked office environment, various of the control and/or software functions described herein may be done in the network system print server or controller rather than in the scanning unit per se. Likewise, as is also well known, scanners may be part of multifunctional machines, such as digital printer/scanner/facsimile/copier machines, and their controls.

All references cited in this specification, and their references, are incorporated by reference herein where appropriate for appropriate teachings of additional or alternative details, features, and/or technical background.

Figure 2:
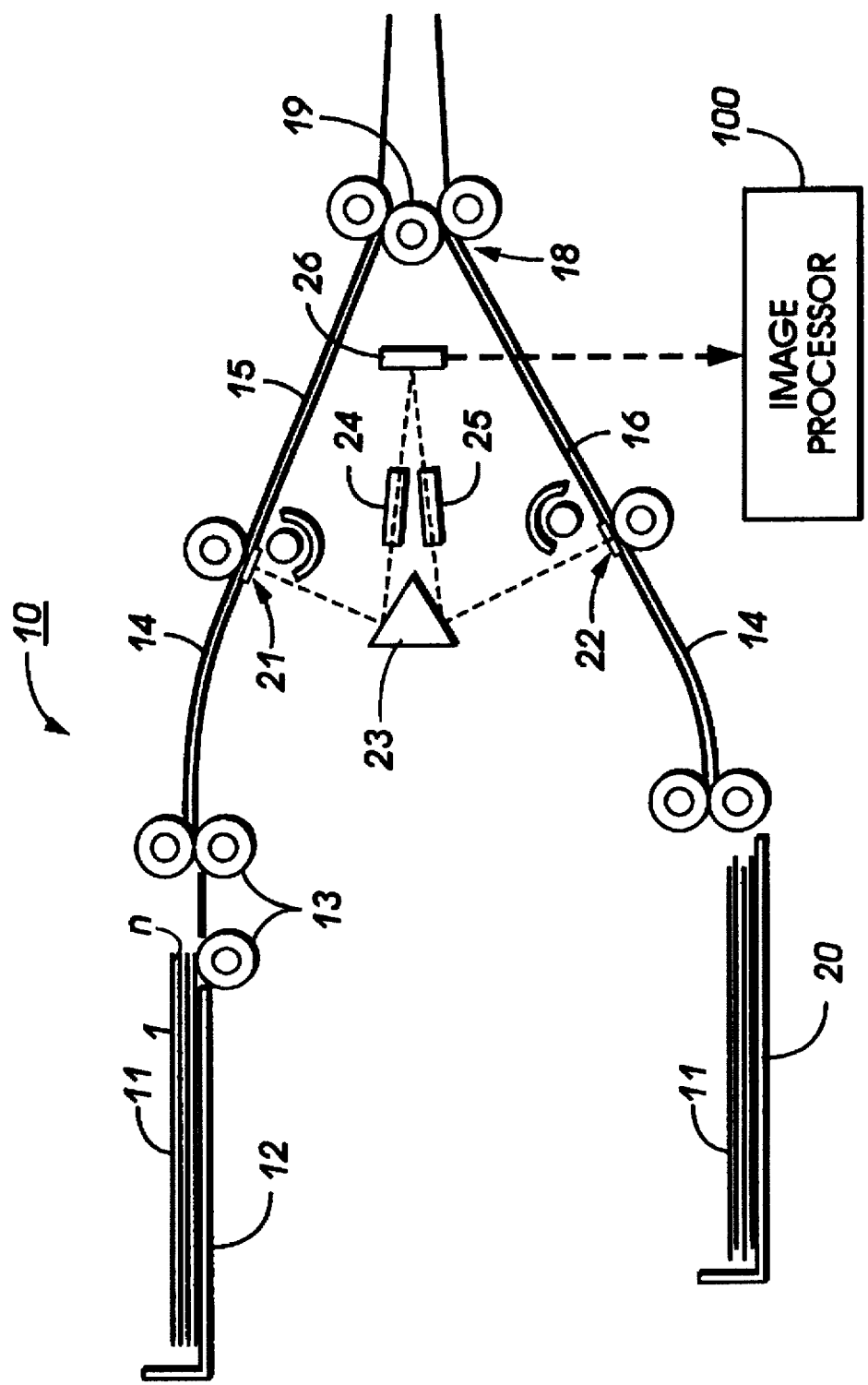
Figure 3:
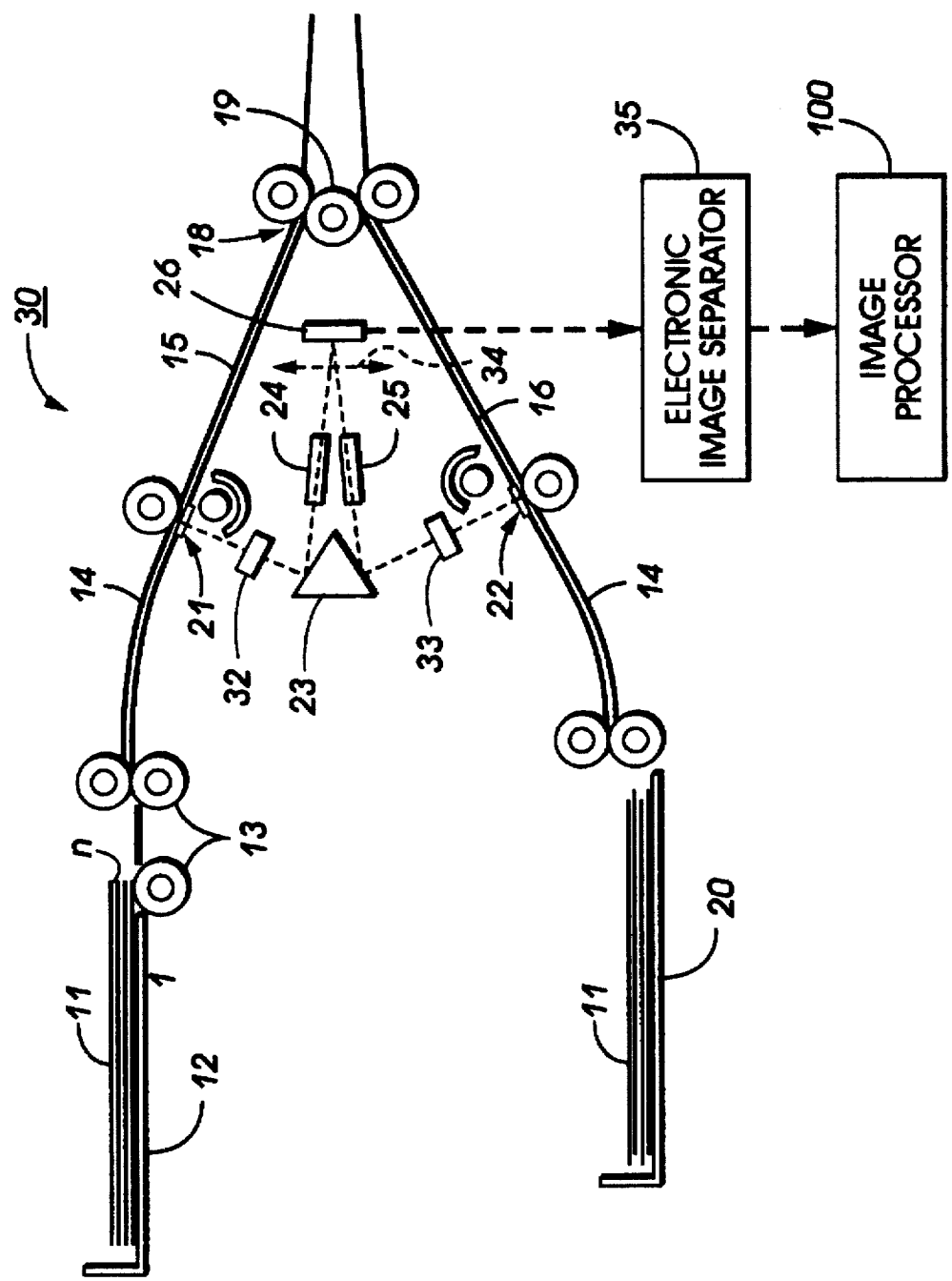
Figure 5:
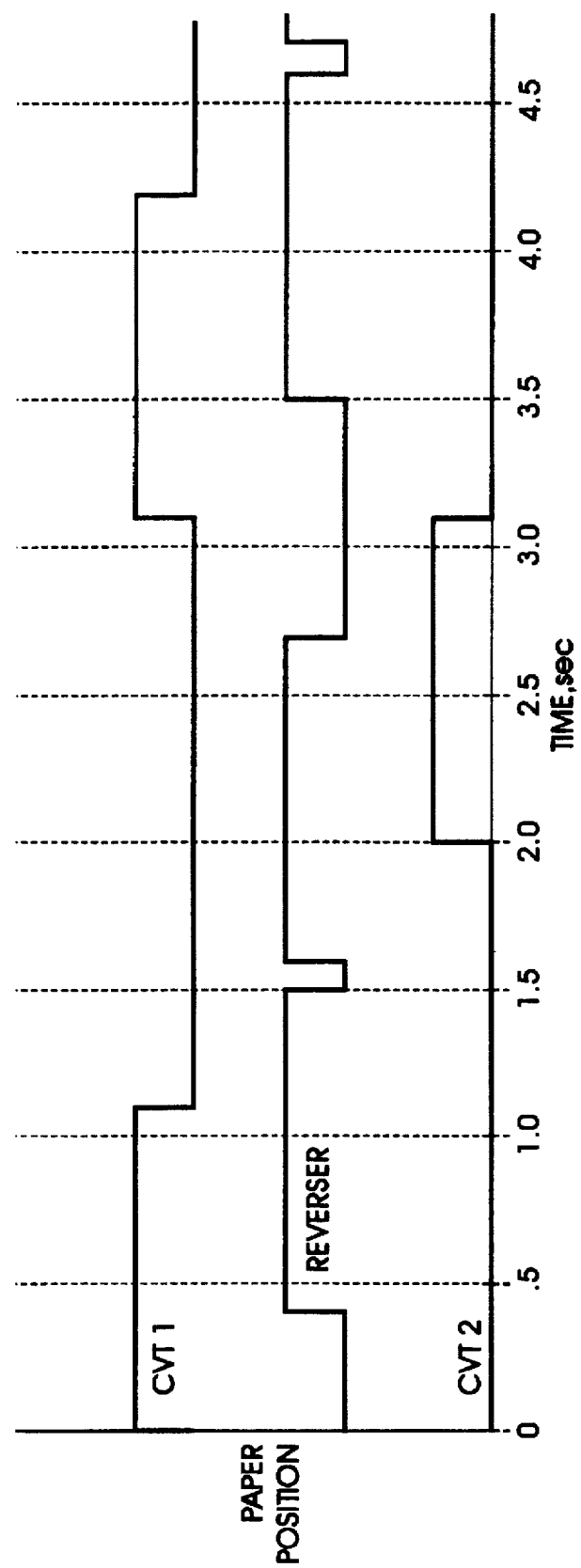
Figure 6:
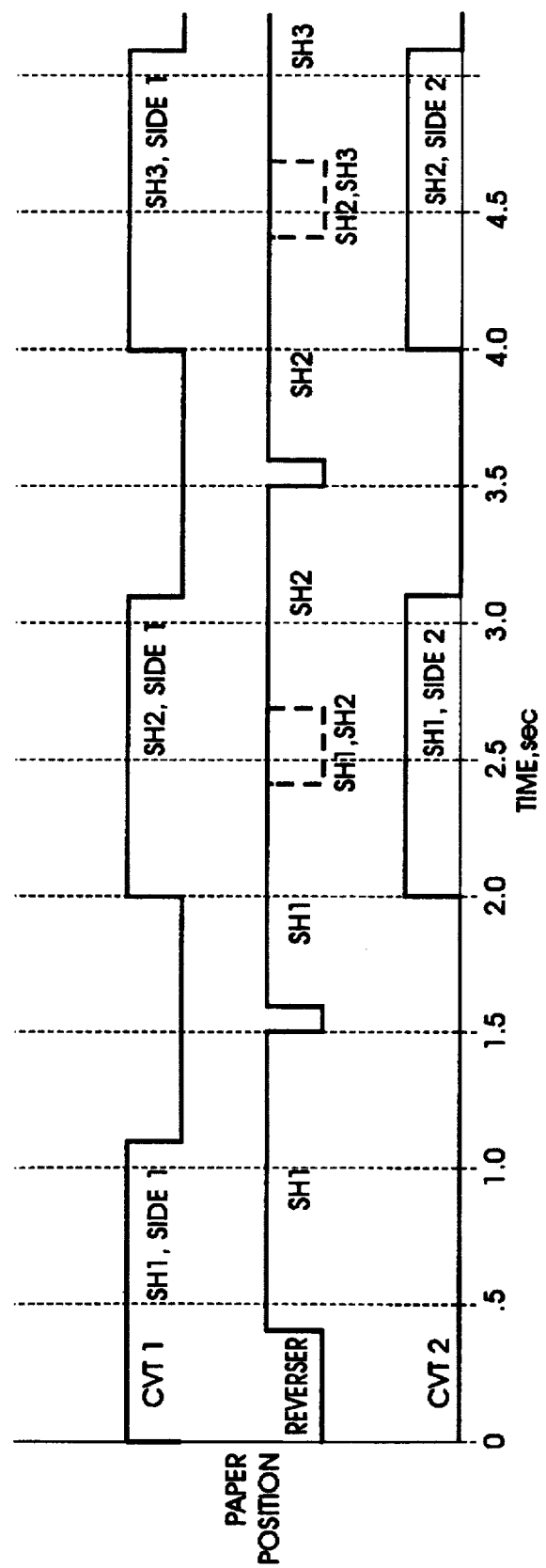
Figure 7:
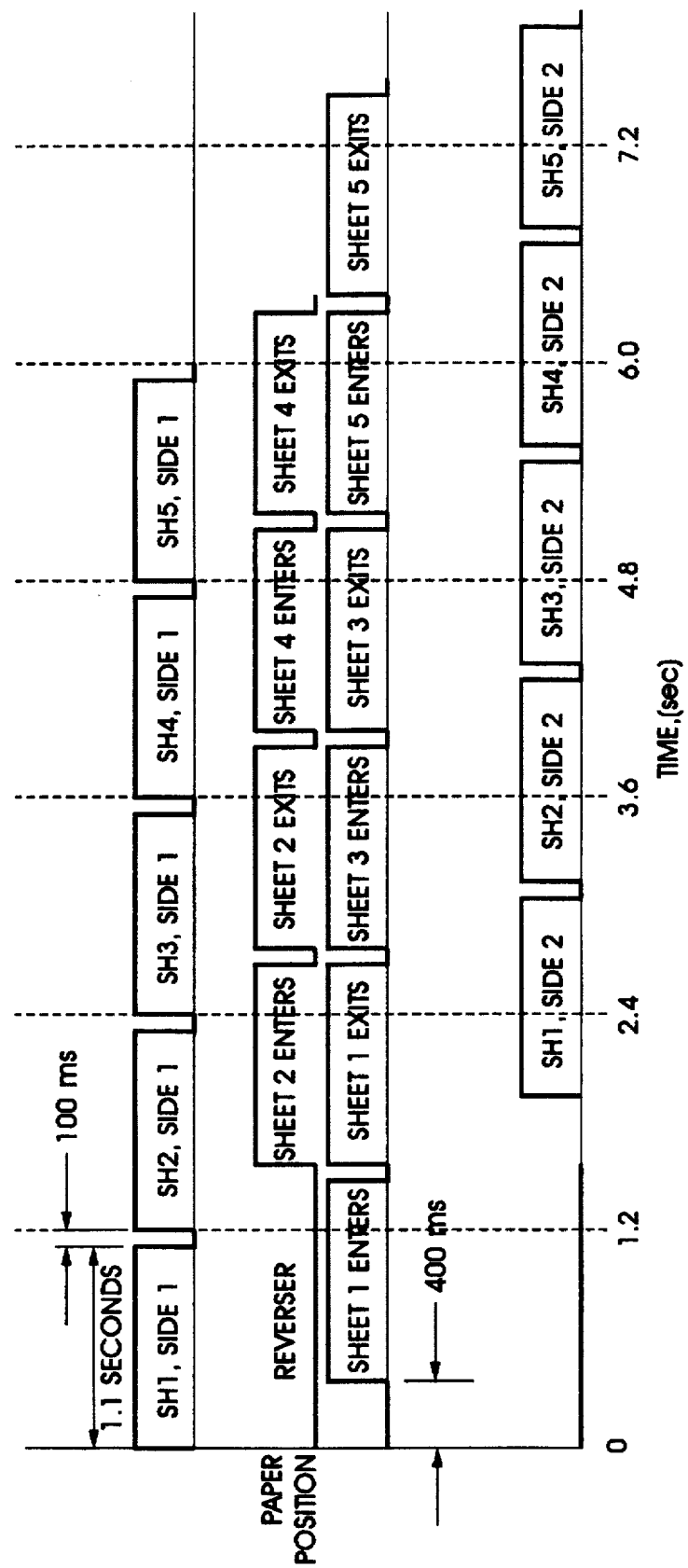

Various of the above-mentioned and further features and advantages will be apparent from the specific apparatus and its operation described in the examples below, as well as the claims. Thus, the present invention will be better understood from this description of these embodiments thereof, including the drawing figures (approximately to scale) wherein:

FIGS. 1 and 2 schematically illustrate a first embodiment of an exemplary duplex and simplex document imaging system, wherein in FIG. 1 the documents sheets are being fed into the system in 1 to N or forward serial page order, while in FIG. 2, without any change in hardware or operation, the same embodiment is shown feeding documents in N to 1 or reverse page order simply by stacking the documents face up in the input tray rather than face down;

FIG. 3 schematically shows another exemplary embodiment of the document imaging system of FIGS. 1 and 2, wherein LCD modulators or shutters, or an alternative moving plate shutter (shown in phantom) provide alternate line scanning between the two document imaging stations, allowing concurrent or essentially simultaneous copying of documents in the two imaging stations with the same single electro-optical imager, with a simple system for separating the two page images line by line, but without requiring other changes in the embodiment of FIGS. 1 and 2;

FIG. 4 schematically shows another embodiment which is also similar in paper path or document feeding architecture to the embodiments of FIGS. 1–3, but in which the two imaging stations are line scanned by laser beams and an electronic detector detects the reflected light from the imaged documents of each imaging station, thus also providing simultaneous document imaging from both imaging stations of two documents in alternate line scans;

FIG. 5 is an exemplary timing and sheet image sequencing chart for the document sheet feeding and imaging of the embodiments of FIGS. 1 and 2, with the location of sheets in the first (CVT 1) constant velocity imaging station shown across the top line, sheets in the reverser shown in the middle line, and sheets in the second imaging station (CVT 2) shown in the bottom line;

FIG. 6 is a similar exemplary sheet feeding and imaging timing chart for the embodiments of FIGS. 3 and 4 for concurrent duplex documents imaging; and FIG. 7 is a further such timing chart for the feeding of sheets through any of the disclosed document imaging systems wherein the reversing system or reverser allows two sheets to pass simultaneously therein, such as discussed above in connection with the cited prior U.S. Pat. No. 4,214,740 by Thomas Acquaviva. (That is, a reverser in which two sheets can be in the reversing system simultaneously traveling in two different directions, with one sheet entering the input nip of the three roller system while the prior other sheet is exiting the other nip of the three roller system, as described in that and other patents.)

Referring now to the specific embodiments of the exemplary document imaging system 10 of FIGS. 1 and 2, the imaging system 30 of FIG. 3, and the imaging system 40 of FIG. 4, it will be appreciated that there are a number of common elements shown, particularly as to the basic architecture and document sheet feeding paths, which are commonly numbered here. It will also be appreciated that various known or alternative sheet feeding paths and baffles, sheet reversers, and optics, may be employed other than those disclosed herein, various of which alternatives are described in the above cited and other document feeding systems, patents, and hardware.

In all of the illustrated exemplary imaging systems 10, 30, and 40, duplex document sheets 11 are sequentially fed from a stack thereof conveniently loaded into an upper (not lower) document input tray 12. As disclosed here, these documents 11 to be imaged are fed out from the tray 12 by a bottom sheet input feeder and takeaway rollers system 13 of a conventional type, as is well known. Although equally well-known top sheet separator/feeders could be utilized instead, the disclosed system provides correct collated order stacking of the output sheets in the underlying output tray 20 without requiring any inversion of the sheet, and also allows, as noted, either 1 to N or N to 1 order document feeding without changing any of the hardware or requiring inversions, as shown by this difference in FIGS. 1 and 2. In FIG. 1, for 1 to N page order imaging, the stack of documents to be imaged is simply loaded face down in input tray 12, and without inversion will stack face down in the output tray 20 in the same normal collated order. In FIG. 2 it is shown that by simply stacking the documents to be imaged face up in the same input tray 12 that after their imaging, in N to 1 or reverse order, they will also stack face up in the output tray 20 without any inverting or special handling.

It may be seen that the illustrated document sheet path in all of these example imaging systems 10, 30, and 40 is essentially the same, with possible alternatives for any of them as will be further described. There is a simple "V" shaped document path 14 with no arcuate loops or other sheet inversions. The entire document path consists essentially of two linear or planar sheet feeding paths. The documents are fed directly from the input tray 12 through its input sheet feeding system 13 into the first arm or path 15 of the V shaped document path 14. The documents are then returned to the output tray 20 by the second arm 16 of the V shaped document path 14 from the converging mating or base position 18 of the V. At that base position 18 there is located a simple sheet reversing system 19. As shown, this may be in the form of the sheet reversing portion of a well-known three roll (tri-roll) sheet inverter, in which the sheet enters the upper nip between the upper and central rollers and then is discharged from the nip of the central and lower rollers. As previously noted, the reversing system 19 can be of the type in which there is an overlap or simultaneous entry and exit of one sheet while another sheet is exiting, as described in said Acquaviva U.S. Pat. No. 4,214, 740. However, this sheet reversing system 19 could, alternatively, be a single pair of rollers with one nip, driven by a reversible motor, and a simple sheet output deflector, rather than the unidirectional drive of the central roller of the illustrated three roll system. With this sheet reversal chute or path, the "V" shaped path may also be considered a "Y" shaped path, although the sheet does not need to be planar in the reverser 19 and could be arcuate.

Irrespective of the type of sheet reversing system 19, it will be appreciated that a document here is not inverted therein, merely reversed. Nowhere in the V shaped document path 14 is the document ever turned over. Thus, its orientation is maintained, and the reliability or jam problems associated with inverting systems are eliminated. As may be seen, the input tray 11 and output tray 20 may be conveniently located above one another at the respective open ends of the V shaped document path 14. The V shaped document path is essentially lying on its side to provide a compact and low profile configuration, yet almost linear sheet feeding paths throughout. The documents only have to change their feeding orientation by the relatively small angle of the V at its base position 18 from going into the sheet reversing system 19 from the inner end of the first arm 15 versus going out of the sheet reversing system 19 into the upstream end of the second arm 16.

The above described unusually simple, short, linear, and reliable document sheet feeding path is combined with, and allowed by, the unique imaging systems, 10, 30 or 40 disclosed herein, in which the entire optic system is located inside of this V shaped document path 14, between the two imaging stations, and does not require any moving optical elements, such as disadvantageous flipping or moving mirrors, or interrupted optics paths. Note that because all of the optics in these imaging systems are all located inside the paper feeding path, that they are protected, and that jam clearance or sheet removal from the paper feeding path is simplified in the event of a stoppage of the system for any reason.

In all of the illustrated imaging systems here, there is a first imaging station 21 intermediately in the first arm 15 of the document path 14, and a second imaging station 22 correspondingly located in a corresponding position in the second arm 16 of the document path 14. No long or arcuate document refeeding path is required in this system for refeeding of duplex documents to be scanned on their opposite sides. Both of these imaging stations 21 and 22 may be otherwise conventional constant velocity document transport systems with narrow imaging platens or windows as disclosed in the cited and other art, with conventional illumination (except in FIG. 4), thereby providing conventional line scanning of the respective exposed side of a document sheet moving through the imaging station 21 or 22. Conventional document line illumination systems are schematically illustrated under (inside of) the document paths in FIGS. 1, 2, and 3, to illuminate the portion of documents passing through the imaging stations 21 and 22.

The optical imaging systems for the imaging stations 21 and 22 of FIGS. 1, 2, and 3 all have the same fixed wedge shaped dual mirror 23 centrally located between the two imaging stations 21 and 22, and thus also centrally between the first and second arms 15 and 16 of the V shaped document path 14 here. The two separate (opposite side) mirror surfaces of the dual mirror 23 here respectively provide desirable substantially perpendicular optical paths imaging of the document line scan image from the imaging stations 21 and 22, and their respective reflection into respective first and second selfoc lenses 24 and 25, which are well known and commercially available. The lenses 24 and 25 commonly focus onto a single electronic imaging device, here a single electro-optical array 26. The array 26 may be what is called a "full width" array, although it may be shorter than the actual document width with optical image reduction by lenses 24 and 25 and their positioning.

This CCD or other imager array 26 is in turn conventionally electronically connected to conventional, well known, electronic digital image processing systems, devices, or chips, pre-programmed, or programmed with software, here schematically identified as the image processor 100. As is well known, the resultant electronic digital images may then be forwarded on for image compression or other processing and storage, and/or screen displays, and/or controlling a laser printer for digital printing or copying, locally or at remote sites, and/or conversion to lower resolution facsimile page images for facsimile transmission, as variously discussed in the above cited and other patents, and known from commercial products. The disclosed systems may be utilized as stand-alone scanners, or combined or integrated with multi-function apparatus providing various of such functions or outputs.

Referring now particularly to the imaging system 30 of FIG. 3 and the imaging system 40 of FIG. 4, there are differences in these embodiments in their imaging systems which will now be described. Both FIGS. 3 and 4 allow concurrent or substantially simultaneous scanning of documents, including duplex documents, at, or approximately at, the full duplex sheet document feeding rate, by providing alternate line scanning between the two imaging stations, as opposed to the alternate documents full page scanning of FIGS. 1 and 2. That is, in FIGS. 1 and 2, the first imaging station 21 feeds through a document and the entire image of that document sheet side is fed to the single CCD array 26 through one facet of the dual mirror 23 through the first sefloc lens 24 before the next document sheet to be imaged is started to be scanned in the second imaging station 22, and then vice versa, so that the sides of documents are alternately scanned in alternate passes of documents through the two imaging stations 21 and 22. That is already a highly efficient system, as shown by the sheet timing and sequencing of imaging of the chart of FIG. 5. However, in contrast, as shown in the sheet feeding and imaging sequencing time chart of FIG. 6, an even faster imaging rate can be provided in the same document feeding path without increasing the sheet feeding velocity by providing alternate line imagings as in the embodiments of FIGS. 3 and 4.

In the imaging system 30 of FIG. 3, this can be provided as shown by the first and second LCD modulators 32 and 33, respectively located in the optical path from the first and second imaging stations 21 and 22, to provide alternate line shuttering of the light images therefrom. That is, by opening the first LCD modulator 32 while closing or blocking light with the second, 33, only the light from the first imaging station 21 reaches the CCD or other imager array 26. Then, by rapidly switching electronically in the known manner the LCD modulators 32 and 33 so that the first modulator 32 is now closed or shuttered and the second modulator 33 is now open to transmit light therethrough, the CCD array 26 now receives light only from the second imaging station 22. As may be seen, this allows rapid switching at the desired line scanning rate between the two imaging stations, so that the CCD array 26 receives alternate scanning lines alternating between the two imaging stations. The CCD array 26 is then connected to an electronic image separator 35 which simply separates the alternate lines of digital image information coming from the CCD array 26 line by line into two separate page images to reconstruct the conventional page images. As noted above, this can be done simply by switching between two buffer outputs whenever a line signal is provided by the imager 26, which signal is already available.

As an alternative to the use of LCD modulators or shutters such as 32 and 33, an oscillating mechanical shutter such as a thin metallic knife edge or slotted sheet vibrated at the desired frequency may be utilized instead. This is illustrated here in phantom at 34, at a different position, where the two optical paths are converging, between the two sefloc lenses 24 and 25 and the CCD array 26. Another alternative would be a rotating slotted drum shutter. Another alternative for this alternate line optical path selection and deselection of the embodiment of FIG. 4 could be a single light blocking lightweight thin plate mounted along and extending from a counterbalanced shaft, which shaft would be mounted between the beams in a position where they are closely adjacent to one another and of relatively narrow width, i.e., near where the beams are being focused onto the CCD array. As the shaft would be rotated rapidly by its drive motor, the plate would alternatingly block one of the image light beams at a time except during a brief transition period, in which the array can be reading out. Yet another alternative system for providing rapid switching between the image of scanning one line in the first imaging station 21 and the next line image from the second imaging station 22, etc., would be to provide very rapid on and off operation of the imaging station illuminators or illumination lamps, such as by using flash or strobe lamps, providing the electronic imager 26 could handle this input.

The imaging system 40 of FIG. 4 illustrates another different optical imaging system. It is another system for accomplishing the concurrent or substantially simultaneous imaging of two different documents at the same time in both of the imaging stations 21 and 22, as generally described above for FIG. 3. In the system 40 of FIG. 4, instead of having conventional illumination lamps as illuminators for the two imaging stations 21 and 22, the illumination of the document in the two imaging stations 21,22 is provided by a dual beam laser input scanner 42. The alternating scanning beams from the laser 42 are reflected into the document here by a dual mirror 43 which, like the dual mirror 23, can be centrally located and rigidly mounted inside the document path and does not need to move at any time. It will also be appreciated that in lieu of an alternating beams laser 42, that a single beam laser may be modulated by rapid shuttering and/or polygon scanning to alternately line scan or sweep the documents in the imaging stations 21 and 22 in alternate lines. Alternatively, rather than using a conventional rotating polygon scanner to sweep the laser light beam lines across the documents, an anamorphic lens beam-spreader could be utilized for an unswept beam and modulated to alternately illuminate the two imaging stations line by line. In the latter case, the imager of FIGS. 1–3 may be preferable, however. Here, in FIG. 4, where light beam sweeping is provided across the document, the image may be electronically detected by a known single cell detector imager system in which a lucite rod or other light collector collects the light being reflected from the document at the respective imaging stations and converts the alternating intensity of this reflected light into an electronic signal with a single cell detector. This is schematically shown here as first cell detector 44 at the first imaging station 21 and second cell detector 45 at the second imaging station 22. The outputs of the two detectors are then processed in an electronic image separator 46 to generate the two separate page images by separating the alternate lines from the alternating image stations, as generally described above in connection with FIG. 3. As noted, this electronic image separator 46 (like 35) can be implemented without difficulty and with simple hardware or software, since it is simply a matter of switching alternating lines of image signals into separate temporary page buffers, or the like.

Productivity, in pages imaged per minute for a given sheet velocity, can be high with any of the disclosed systems. The distance in path length and transit time between the two imaging stations 21 and 22 is short, even for duplex imaging. It can desirably be only slightly greater than the dimension of a single document in the sheet feeding direction.

In the examples of FIGS. 3 or 4, and the chart of FIG. 7, the exemplary sequence for the copying of the respective sides of a 5 sheet set of duplex document sheets, with sheets completely overlapping in the reverser, may be as follows: sheet 1, side 1; sheet 2, side 1 and sheet 1 side 2; sheet 3 side 1 and sheet 2 side 2; sheet 4 side 1 and sheet 3 side 2; sheet 5 side 1 and sheet 4 side 2; sheet 5 side 2. Note that the alternate sides of alternate sheets are being imaged substantially simultaneously except for the first and last pages of the set. The result, for larger set sizes, is that twice the number of sides of documents are imaged in fewer than half the number of pitches as compared to some other systems. Put another way, the duplex imaging rate in sides per second can be at least twice the simplex document scanning rate of some other systems.

In the example of FIGS. 3 and 4 and the chart of FIG. 6, the exemplary sequence for the copying of the respective sides of a three sheet set of duplex documents, with sheets only slightly overlapping in the reverser, may be as follows: sheet 1, side 1; sheet 2, side 1 and sheet 1, side 2; sheet 3, side 1 and sheet 2, side 2; sheet 3, side 2. Note that alternate sides of alternate sheets are being imaged substantially simultaneously except for the first and last page of the set.

As described, the embodiments of FIGS. 3 and 4 or the like, allow alternate line imaging, so that for duplex document scanning it is not necessary to first scan one document sheet side in the first imaging station 21 and then wait to scan another document side subsequent thereto in the second imaging station 22. Rather, in the embodiments of FIGS. 3 and 4, the second side of a duplex document sheet can be scanned in the second imaging station 21 substantially simultaneously with the scanning of the first side of another subsequent, duplex document sheet in the first imaging station 21. That enhanced productivity is illustrated in FIGS. 6 and 7. Two simplex document sheets may also be scanned concurrently in the two imaging stations with such systems, if desired, or intermixed jobs.

As another alternative, for simplex documents, only a single imaging station, such as 21, need be utilized. The velocity of the simplex documents may then be accelerated in the second arm 16 for rapid document ejection into the output tray 20, since the second imaging station 22 in the second arm 16 is not being utilized for such imaging of simplex documents.

As with any electronic scanning system, the width of the line scans and the velocity of the document sheets fed through the scanners may be adjusted or set depending upon the desired resolution in that scanning direction, the type and resolution of the electronic imaging device and/or the electronic capacity or data handling rate of the associated electronic image processing apparatus and software. Also, known pixel interpolation techniques may be utilized between scan lines.

As noted, the effective sheet transit distance between the two imaging stations, and thus the sheet transit time therebetween, can be even shorter if the sheet reversing system 19 therebetween is of the type which allows simultaneous entry and exit of two sheets. Referring more specifically to the high productivity copying system illustrated by the feeding and timing chart of FIG. 7, to give an example of its productivity, assume as one example that the constant velocity transport systems of the sheet feeding paths are set to feed sheets at a CVT rate of only ten inches per second, and that the sheets are 11 inches long in the sheet feeding direction. Remember that in this FIG. 7 example it is assumed that two sheets can be traveling in different directions simultaneously in the sheet reversing system 19. Thus, in this example, the time for a document sheet to reverse between the two imaging stations at the CVT rate is 1.1 seconds. Assuming a distance from the output of the first imaging station to the reverser 19 of 4 inches, that time travel is only 0.4 seconds even at this relatively low sheet feeding and imaging velocity of 10 ips. Likewise, the time from the sheet reverser 19 to the second CVT of the second imaging station would also be only 0.4 seconds in this example. This equates in this example to a time between imagings of a sheet (an intercopy sheet time) of only 0.1 second, and only a 1 inch interdocument gap or pitch distance. That is highly efficient and reduces the requirements for document speed in the overall system and allows additional time for the document to pass through the imaging stations for a desirable slower imaging rate. The net result in this example is that a document sheet can be fed into the system every 1.2 seconds to provide a document scanning or imaging rate of 50 document sheets per minute (50 CPM), assuming concurrent scanning of two different sides, as in the embodiments of FIGS. 3 and 4. For a corresponding example in a system without simultaneous feeding in and feeding out of sheets in the sheet reversing system 19, the documents imaging rate could still be 30 CPM, as shown in FIG. 6.

Referring now to the timing chart of FIG. 5, for the embodiments of FIGS. 1 and 2, and assuming an example of a simplex document sheet fed every 3.1 seconds, that would equate to the ability to image 19.35 page images per minute. (It will also be appreciated that for simplex copying in which the second imaging station 22 is not utilized that the illumination therefore need not be turned on.) In duplex, also feeding one duplex document sheet every 3.1 seconds would also equate to 19.35 page side images per minute, i.e., no loss in productivity for duplex. The immediately above examples are also based on an assumption of a paper path velocity of 10 inches per second, a document length of 11 inches, the time for the document to feed past the imaging station CVT of 1.1 seconds, and a distance from the imaging station to the sheet reverser 19 of 4 inches, equating to 400 milliseconds, but with the time to change the direction of the sheet in the reverser 19 being 100 milliseconds.

In the timing example of FIG. 6, for FIGS. 3 and 4, the times shown along the bottom of the chart are based on similar assumptions, and on feeding documents every two seconds, or 30 pages per minute, and imaging documents every two seconds to give 60 images per minute output from the 30 document sheets per minute input.

As noted above, the disclosed V or wedge shaped paper path architecture can also provide a low profile silhouette as compared to duplex document systems which require large sheet path loops for safely turning over the duplex documents. Furthermore, this simple paper path architecture can be compatible with any normal length document sheet. As noted, the sheet reverser can be a variable timing reversible nip. The three roll type sheet reverser 19 illustrated typically has an elastomeric or repositionable end stop at the end of its reversing chute, or a reversing roll nip therein which may be actuated by a trail edge sensor at the sheet input. The sheet reversing system can thus be designed or operated to automatically compensate for differences in document lengths by compensating for or changing the effective distance between the two imaging stations by changing the point or timing of the reversing of the lead edge to trail edge orientation and direction of movement of the document therein. E.g., shorter documents can be automatically reversed sooner.

While the embodiments disclosed herein are preferred, it will be appreciated from this teaching that various alternatives, modifications, variations or improvements therein may be made by those skilled in the art, which are intended to be encompassed by the following claims:

What is claimed is:

1. An imaging system for imaging with higher productivity both of first and second opposing sides of duplex document sheets sequentially fed from a stack thereof in an input tray, comprising:

a generally "V" shaped document feeding path with first and second arms meeting at a base position, a document sheet feeding input path system for sequentially feeding document sheets from said input tray into and through said first arm to said base position, a document sheet reversing system at said base position for reversing the direction of movement of document sheets received from said first arm and feeding said document sheets into said second arm without inversion, a document sheet feeding output path system for feeding document sheets through said second arm from said base position, a document sheet output tray for receiving document sheets fed through said second arm from said base position, a first imaging station in said first arm for imaging said first sides of said document sheets, and a second imaging station in said second arm for imaging said second sides of said document sheets, and an optics system for said first and second imaging stations which is positioned in between said first and second arms and inside of said generally "V" shaped document feeding path so that said document sheets feed through said second arm without interfering with said imaging of said first sides in said first imaging station.

2. The imaging system of claim 1 wherein said imaging system feeds and images both of said first and second opposing sides of said duplex document sheets sequentially fed from said input tray to said output tray without ever inverting or turning over said duplex document sheets so that said duplex document sheets are returned to said output tray in the same orientation as said stack in said input tray.

3. The imaging system of claim 1 wherein said duplex document sheets may be stacked in said input tray and sequentially fed to be imaged in either forward or reverse serial order.

4. The imaging system of claim 1 wherein said "V" shaped document feeding path is lying on its side.

5. The imaging system of claim 1 wherein said first and second imaging stations image said first and second opposing sides of the same document sheet in immediate sequence.

6. The imaging system of claim 1 wherein said first and second imaging stations concurrently image all of said first and second opposing sides of different sequential said document sheets in alternating image lines alternating between said first and second imaging stations.

7. The imaging system of claim 1 wherein said first and second imaging stations comprise a non-moving optics system which is entirely mounted in between said first and second arms of said document feeding path.

8. The imaging system of claim 1 wherein said first and second imaging stations comprise respective first and second converging paths optics systems and a single common electronic image conversion device onto which said first and second optics systems optically line image said document sheets while said document sheets are feeding through said first and second imaging stations.

9. The imaging system of claim 8 wherein said first and second imaging stations image said first and second opposing sides of the same document sheet in immediate sequence.

10. The imaging system of claim 8 wherein said first and second imaging stations concurrently image all of said first and second opposing sides of different sequential said document sheets in alternating image lines alternating between said first and second imaging stations.

11. An imaging system for imaging both of the first and second opposing sides of duplex document sheets with improved productivity, said imaging system including a sheet feeding path system with an input tray and first and second sheet feeding paths, and first and second imaging stations, for sequentially feeding said duplex document sheets from a stack thereof in said input tray to said first imaging station in said first sheet feeding path for imaging said first sides of said document sheets and then feeding said document sheets on to said second imaging station in said second sheet feeding path for imaging said second sides of said document sheets, wherein, said first imaging station comprises an electronic imaging device and a first optics path system for imaging said first sides of said document sheets onto said electronic imaging device, and said second imaging station comprises said same electronic imaging device and a second optics path system for imaging said second sides of said document sheets onto said same electronic imaging device, and wherein said electronic imaging device and said first optics path system and said second optics path system are all located in between said first sheet feeding path and said second sheet feeding path.

12. The imaging system of claim 11 wherein said first and second optic path systems comprise non-moving optics entirely mounted in between said first and second sheet feeding paths.

13. The imaging system of claim 11 wherein said first and second optics path systems share a wedge shaped dual mirror interposed between said first imaging station and said second imaging station to provide a converging optical path from both said first and second imaging stations to said same electronic imaging device.

14. The imaging system of claim 13 wherein said wedge shaped dual mirror is fixed and is the only mirror in said first and second optics path systems.

15. The imaging system of claim 11 further including an output tray, and wherein said sheet feeding path system feeds said duplex document sheets through both said first and second sheet feeding paths without ever inverting or turning over said duplex document sheets so that said duplex document sheets are returned to said output tray in the same orientation as in said input tray.

16. The imaging system of claim 11 wherein said duplex document sheets may be stacked in said input tray and sequentially fed into said sheet feeding path system to be imaged in either forward or reverse serial order.

17. The imaging system of claim 11 further including an output tray, and wherein said sheet feeding path system includes a sheet reverser between said first and second sheet feeding paths, and said sheet feeding path system feeds said duplex document sheets through both said first and second sheet feeding paths with one reversal in said sheet reverser and without ever inverting said duplex document sheets so that said duplex document sheets are returned to said output tray in the same orientation as said stack in said input tray.

18. The imaging system of claim 11 wherein said sheet feeding path system comprises:

a generally "V" shaped document feeding path with first and second arms meeting at a base position, a document sheet feeding input path system for sequentially feeding document sheets from said input tray into and through said first arm to said base position, a document sheet reversing system at said base position for reversing document sheets received from said first arm and feeding them into said second arm, a document sheet feeding output path system for feeding document sheets through said second arm from said base position, and a document sheet output tray for receiving documents fed through said second arm from said base position.

19. The imaging system of claim 11, wherein said second sheet feeding path is operated at a much higher sheet feeding velocity than said first sheet feeding path for imaging simplex documents only at said first imaging station.

* * * * *